(12) United States Patent
Sagesaka (10) Patent No.: US 10,542,379 B2
(45) Date of Patent: Jan. 21, 2020

(54) ON-VEHICLE COMMUNICATION DEVICE, COMMUNICATION CONTROL METHOD AND VEHICLE

(71) Applicant: RENESAS ELECTRONICS CORPORATION, Tokyo (JP)

(72) Inventor: Yasuhiro Sagesaka, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/106,821

(22) Filed: Aug. 21, 2018

(65) Prior Publication Data

US 2019/0116462 A1 Apr. 18, 2019

(30) Foreign Application Priority Data

Oct. 13, 2017 (JP) .................................. 2017-199395

(51) Int. Cl.
*H04W 52/02* (2009.01)
*H04W 72/04* (2009.01)
(Continued)

(52) U.S. Cl.
CPC .............. *H04W 4/027* (2013.01); *H04W 4/44* (2018.02); *H04W 4/80* (2018.02); *H04W 52/0251* (2013.01); *H04W 52/0274* (2013.01)

(58) Field of Classification Search
CPC ........... H04W 4/40; H04W 4/44; H04W 4/80; H04W 4/46; H04W 36/32; H04W 4/023;
(Continued)

(56) References Cited

U.S. PATENT DOCUMENTS

2006/0073857 A1 4/2006 Hanabusa et al.
2010/0056181 A1 3/2010 Rippon et al.
(Continued)

FOREIGN PATENT DOCUMENTS

EP 3349514 A1 * 5/2016 ............ H04W 52/02
JP 2009-232065 A 10/2009

OTHER PUBLICATIONS

Extended European Search Report issued in corresponding European Patent Application No. 18193365.6-1203, dated Apr. 5, 2019.

*Primary Examiner* — Gary Lafontant
(74) *Attorney, Agent, or Firm* — McDermott Will & Emery LLP (57) ABSTRACT

An on-vehicle communication device has a communication unit which communicates with a roadside device, a roadside device position information storage unit which stores in advance first position information indicating a position of the roadside device, a vehicle position information acquisition unit which acquires second position information indicating a position of the vehicle, an approach decision unit which decides whether the vehicle approaches the roadside device on the basis of the first position information stored in the roadside device position information storage unit and the second position information that the vehicle position information acquisition unit acquires and a communication control unit which switches a state of the communication unit from a power-saving state to a non-power-saving state in a case where the approach decision unit decides that the vehicle approaches the roadside device.

16 Claims, 6 Drawing Sheets

(51) Int. Cl.
*H04W 76/20* (2018.01)
*H04W 4/02* (2018.01)
*H04W 4/44* (2018.01)
*H04W 4/80* (2018.01)

(58) Field of Classification Search
CPC ..... H04W 4/027; H04W 40/20; H04W 4/025; H04W 52/02; H04W 52/0235; H04W 52/383
See application file for complete search history.

(56) References Cited

U.S. PATENT DOCUMENTS

| | | |
|---|---|---|
| 2012/0149312 A1 | 6/2012 | Velusamy et al. |
| 2013/0260732 A1 | 10/2013 | Singh |
| 2014/0370909 A1 | 12/2014 | Natucci, Jr. et al. |
| 2017/0162048 A1* | 6/2017 | Sugiura .................. G01S 19/13 |
| 2017/0249007 A1 | 8/2017 | Hardin et al. |
| 2018/0077668 A1* | 3/2018 | Chun .................... H04W 4/046 |

* cited by examiner

ON-VEHICLE COMMUNICATION DEVICE, COMMUNICATION CONTROL METHOD AND VEHICLE

CROSS-REFERENCE TO RELATED APPLICATIONS

The disclosure of Japanese Patent Application No. 2017-199395 filed on Oct. 13, 2017 including the specification, drawings and abstract is incorporated herein by reference in its entirety.

BACKGROUND

The present invention relates to an on-vehicle communication device, a communication control method and a vehicle and specifically relates to the on-vehicle communication device which communicates with a roadside device, and the communication control method and the vehicle for use in communication with the roadside device.

Recently, examinations on a technology for performing communication between the vehicle such as an automobile and so forth with the roadside device which is a communication device installed on a road, that is, so-called road-to-vehicle communication. A communication device used for communication with the roadside device is loaded on the vehicle in order to achieve the road-to-vehicle communication. In addition, the vehicle is requested to achieve various types of communication such as communication with another/other vehicle(s), communication with the outside over a mobile phone network and so forth, not limited to the communication with the roadside device. In view of the above, it is important to suppress power consumption for communication in the vehicle. That is, power saving of the above-described communication device is requested.

Japanese Patent Application Publication No. 2009-232065 discloses two technologies as technologies for controlling a start timing of the road-to-vehicle communication. In a first technology, an on-vehicle communication device switches communication to be performed from vehicle-to-vehicle communication to the road-to-vehicle communication in accordance with whether an electric wave from the roadside device concerned is detected. In addition, in a second technology, the roadside device is equipped with a communication device which performs communication by one communication system (referred to as a communication system A) and a communication device which performs communication by another communication system (referred to a communication system B) which is different from the communication system A. Then, in the second technology, in a case where the vehicle enters a communication area of the roadside device by the communication system B and receives position information of the roadside device concerned by the communication system B, the on-vehicle communication device switches the communication system to be used from the communication system B to the communication system A just before the vehicle enters a communication area of the roadside device concerned by the communication system. A on the basis of the position information of the roadside device concerned. Thereby, the on-vehicle communication device starts the road-to-vehicle communication with the roadside device by the communication system A. That is, in the second technology, start of the communication by the communication scheme A is controlled by obtaining the position information of the roadside device by utilizing another communication system B outside the communication area of the roadside device by the communication scheme A before execution of communication by the communication system A.

SUMMARY

In the first technology, it is necessary to typically confirm presence/absence of the electric wave from the roadside device. That is, it is necessary for the on-vehicle communication device to typically maintain a state where reception of the electric wave from the roadside device is enabled. Therefore, there is such an issue that the on-vehicle communication device consumes a large amount of the electric power. On the other hand, in the above-described second technology, the start timing of the road-to-vehicle communication by the communication system A is determined on the basis of the position information of the roadside device concerned which is received from the roadside device by the communication system B. Therefore, in the second technology, the on-vehicle communication device may not typically confirm presence/absence of the electric wave from the roadside device by the communication system A. However, in the second technology, it is necessary for the roadside device to be equipped with the communication device of the communication system B and therefore the cost of the roadside device is greatly increased. In addition, in the above-described second technology, since the communication system B is a communication system used for the vehicle-to-vehicle communication, it is necessary for the on-vehicle communication to excessively perform processing for receiving the position information from the roadside device in addition to its original processing performed by using the vehicle-to-vehicle communication. For this reason, it is difficult to say that the first and second technologies sufficiently improve the power problem on the on-vehicle communication device.

In view of the above, a technology for achieving suppression of the power consumption in the on-vehicle communication device is still being requested.

Other issues and novel features of the present invention will become apparent from description of the present specification and the appended drawings.

According to one embodiment of the present invention, there is provided an on-vehicle communication device which includes a communication unit which communicates with a roadside device, a roadside device position information storage unit which stores in advance first position information indicating a position of the roadside device, a vehicle position information acquisition unit which acquires second position information indicating a position of the vehicle, an approach decision unit which decides whether the vehicle approaches the roadside device on the basis of the first position information stored in the roadside device position information storage unit and the second position information that the vehicle position information acquisition unit acquires and a communication control unit which switches a state of the communication unit from a power-saving state to a non-power-saving state in a case where the approach decision unit decides that the vehicle approaches the roadside device.

According to one embodiment of the present invention, it is possible to suppress the power consumption in the on-vehicle communication device which communicates with the roadside device.

DETAILED DESCRIPTION

For clarification of description, the following description and drawings are appropriately omitted and simplified. Incidentally, in the respective drawings, the same numerals are assigned to the same elements and duplicated description thereof is omitted as necessary.

Outline of Embodiments

Figure 1:
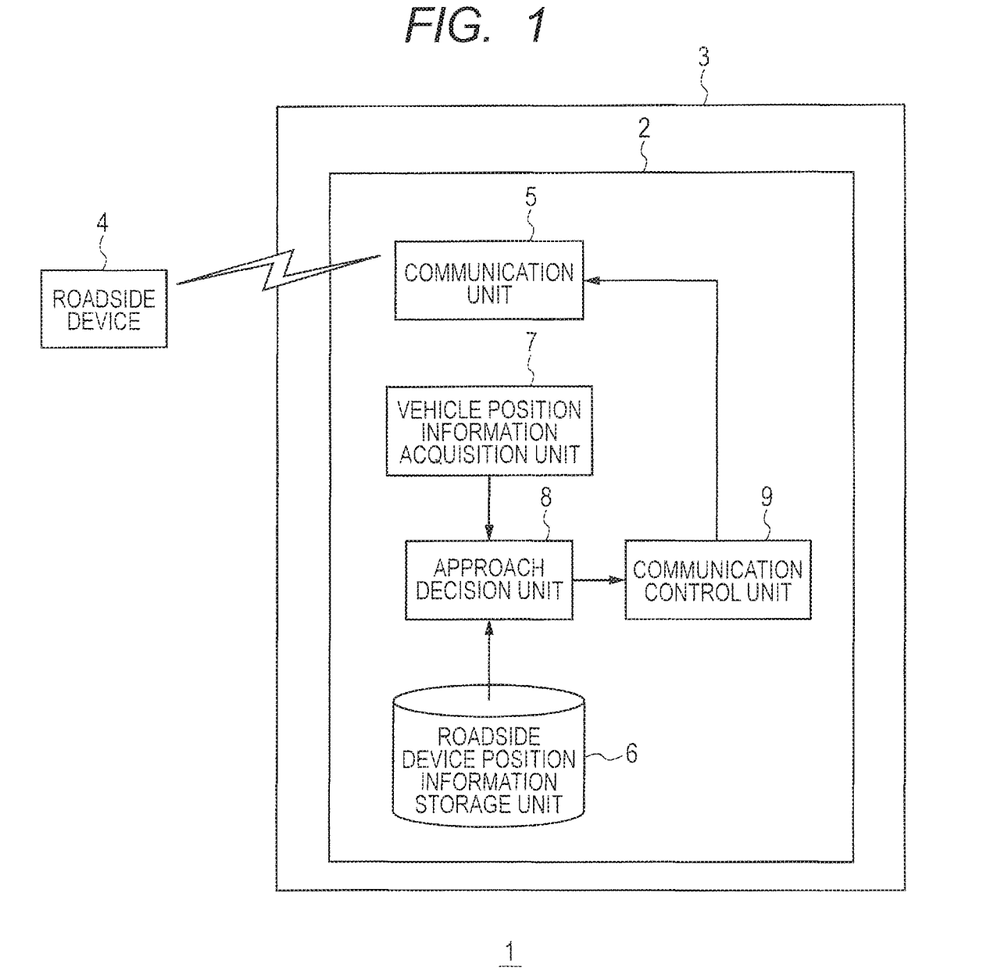
FIG. 1 is a block diagram illustrating one example of a configuration of a communication system including an on-vehicle communication device according to an outline of embodiments.

First, an outline of embodiments will be described prior to detailed description of the embodiments. FIG. 1 is a block diagram illustrating one example of a configuration of a communication system 1 which includes an on-vehicle communication device 2 pertaining to the outline of the embodiments. As illustrated in FIG. 1, the communication system 1 includes a vehicle 3 with the on-vehicle communication device 2 being loaded thereon and a roadside device 4. The roadside device 4 is a device which communicates with the on-vehicle communication device 2 loaded on the vehicle 3 which is present in a communication area in accordance with a predetermined communication scheme. In the communication system 1, the on-vehicle communication device 2 communicates with the roadside device 4 in regard to, for example, traffic information, information on charges of a toll road and so forth. Incidentally, the roadside device 4 is a device which is installed on the road and so forth and one or more roadside devices are present on the road.

The one-vehicle communication device 2 is loaded on the vehicle 3 and includes a communication unit 5, a roadside device position information storage unit 6, a vehicle position information acquisition unit 7, an approach decision unit 8, a communication control unit 9 and so forth.

The communication unit 5 communicates with the roadside device 4. The communication unit 5 is able to make the switch between a power-saving state and a non-power-saving state as electric power states.

The roadside device position information storage unit 6 stores in advance position information (referred to as first position information) indicting a position of the roadside device 4. That is, the roadside device position information storage unit 6 stores information indicating installation positions of one or more roadside devices 4 which are installed in advance. The roadside device position information storage unit 6 stores the information indicating the installation positions of all the roadside devices 4 which are present in, for example, a predetermined geographic range.

The vehicle position information acquisition unit 7 acquires position information (referred to as second position information) indicating a position of the vehicle 3. Incidentally, although the vehicle position information acquisition unit 7 acquires the position information of the vehicle 3 by using a GNSS (Global Navigation Satellite System) technology such as, for example, a GPS (Global Positioning System) technology and so forth, the vehicle position information acquisition unit 7 may acquire information on the current position of the vehicle 3 by using an optional technology not limited to the GNSS technology such as the GPS technology and so forth.

The approach decision unit 8 decides whether the vehicle 3 approaches the roadside device 4 on the basis of the first position information stored in the roadside device position information storage unit 6 and the second position information that the vehicle position information acquisition unit 7 acquires.

The communication control unit 9 switches the electric power state of the communication unit 5 from the power-saving state to the non-power saving state in a case where the approach decision unit 8 decides that the vehicle 3 approaches the roadside device 4.

According to the on-vehicle communication device 2, in a case where the vehicle 3 approaches the roadside device 4, the electric power state of the communication unit 5 is switched from the power-saving state to the non-power-saving state. Therefore, in a case where the vehicle 3 is present outside the communication area of the roadside device 4, it is possible to maintain the communication unit 5 in the power-saving state. That is, it is possible to suppress power consumption in the on-vehicle communication device 2. Incidentally, in the on-vehicle communication device 2, the approach decision unit 8 decides whether the vehicle 3 approaches the roadside device 4 by comparing the first position information which is stored in advance with the acquired second position information. Therefore, it is not necessary for the on-vehicle communication device 2 to typically confirm presence/absence of an electric wave from the roadside device 4. In addition, it is not necessary for the roadside device 4 to communicate with the on-vehicle communication device 2 by a communication system other than the above-described predetermined communication systems for communication with the on-vehicle communication device 2. According to the on-vehicle communication device 2, it is possible to suppress the power consumption in the on-vehicle communication device 2 which communicates with the roadside device 4 in this way.

First Embodiment

Figure 2:
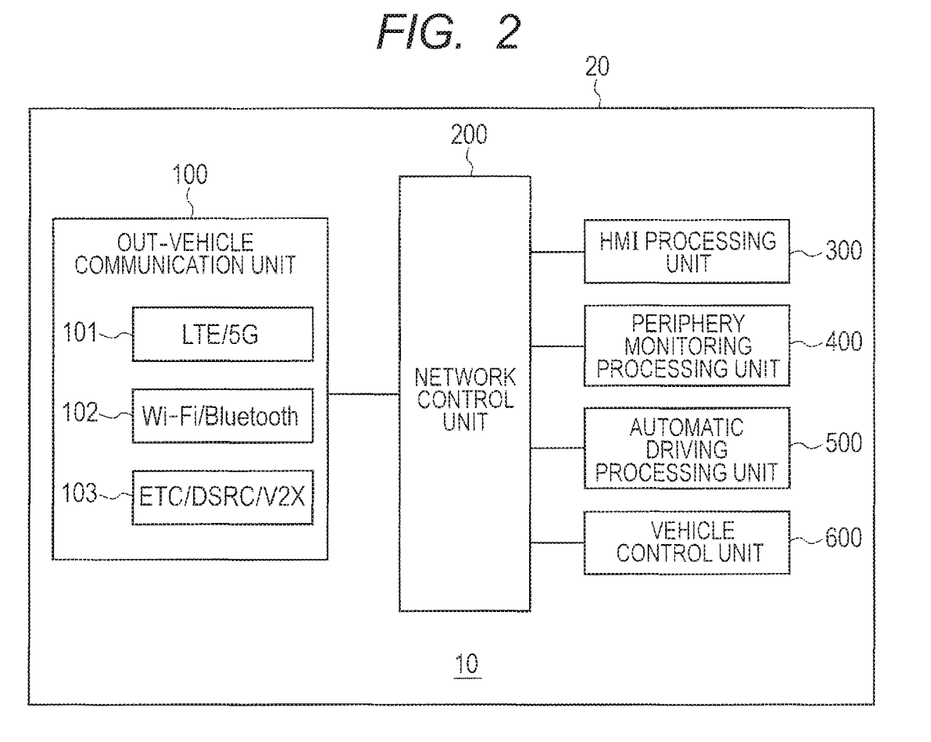
FIG. 2 is a block diagram illustrating one example of a configuration of a vehicle system according to a first embodiment.

Then, details of the embodiments will be described. FIG. 2 is a block diagram illustrating one example of a configuration of a vehicle system 10 according to the first embodiment of the present invention. The vehicle system 10 is a system to be loaded on a vehicle 20. The vehicle system 10 includes an out-vehicle communication unit 100, a network control unit 200, an HMI (Human Machine Interface) processing unit 300, a periphery monitoring processing unit 400, an automatic driving processing unit 500, a vehicle control unit 600 and so forth and the above-described respective units give and receive data and commands via the network control unit 200 and control the whole vehicle 20.

The out-vehicle communication unit 100 has a plurality of different communication functions and communicates with a device arranged outside the vehicle 20. In the first embodiment, the out-vehicle communication unit 100 has an LTE (Long Term Evolution)/5G (Fifth-Generation Mobil Communications System) communication function 101, a Wi-Fi (a registered trade mark)/Bluetooth (a registered trade mark) communication function 102 and an ETC (Electronic Toll Collection System)/DSRC (Dedicated Short-Range Communications)/V2X (Vehicle-to-everything) communication function 103.

The LTE/5G communication function 101 is a function for performing communication using a mobile phone network. The Wi-Fi/Bluetooth communication function 102 is a function for performing communication with an out-vehicle hot spot via Wi-Fi communication or Bluetooth communication. Incidentally, the Wi-Fi/Bluetooth communication function 102 may be used for communication with in-vehicle equipment. The ETC/DSRC/V2X communication function 103 is a communication function used for ITS (Intelligent Transport Systems). The vehicle 20 communicates with the roadside device(s) or another/other vehicle(s) by using the ETC/DSRC/V2X communication function 103. Incidentally, the ETC/DSRC/V2X communication function 103 will be described later while referring to FIG. 4.

The network control unit 200 is coupled with the out-vehicle communication unit 100, the HMI processing unit 300, the periphery monitoring processing unit 400, the automatic driving processing unit 500 and the vehicle control unit 600 to be communicable with the above-described units and control information transmission and reception between/among the above-described units.

The HMI processing unit 300 performs processing for outputting information to a passenger on the vehicle 20. For example, the HMI processing unit 300 performs display processing on a display installed in the vehicle 20. Incidentally, display processing for navigation information and map information may be included in the above-described display processing. For example, the HMI processing unit 300 performs processing for displaying information which is acquired by communication using the out-vehicle communication unit 100.

The periphery monitoring processing unit 400 performs processing of ADAS (Advanced Driver-Assistance Systems). Specifically, the periphery monitoring processing unit 400 monitors the periphery of the vehicle 20 using information obtained from a camera, a sensor and so forth installed in/on the vehicle 20 and executes predetermined processing on the basis of a result of monitoring.

The automatic driving processing unit 500 performs processing for automatic driving of the vehicle 20. For example, the automatic driving processing unit 500 controls the vehicle 20 so as to travel along a predetermined route.

The vehicle control unit 600 controls operations of constitutional elements used for handling the vehicle 20 such as brakes, an accelerator, a steering wheel and so forth.

Figure 3:
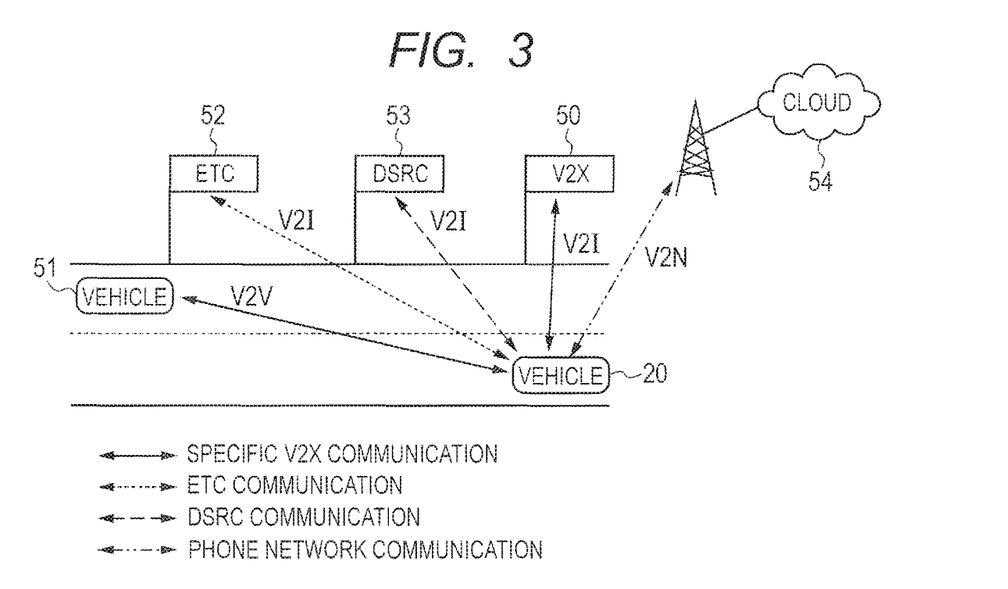
FIG. 3 is a schematic diagram illustrating one example of communication between vehicles and between the vehicle and a roadside device.

Here, communication that the vehicle 20 performs will be described. FIG. 3 is a schematic diagram illustrating one example of communication that the vehicle 20 performs. For example, as illustrated in FIG. 3, the vehicle 20 performs specific V2X communication, ETC communication, DSRC communication and V2N communication (mobile phone network communication). Incidentally, the specific V2X communication is a general term of communication using a specific frequency (for example, 760 MHz in Japan) which is different from a frequency (for example, 5.8 GHz in Japan) which is used in the ETC communication and the DSRC communication.

The specific V2X communication includes communication (V2I: Vehicle-to-Infrastructure) between a roadside device 50 which is installed on a traffic light and so forth and the vehicle 20 and communication (V2V: Vehicle-to-Vehicle) between the vehicle 20 and another vehicle 51. The V2I communication in the specific V2X communication is used for giving warning for collision avoidance at a crossing and warning based on a color switching timing of the traffic light, providing a traffic light wait time and so forth. The V2V communication in the specific V2X communication is utilized for confirmation of peripheral vehicles, giving warning for collision at the moment of an encounter at the crossing, confirmation of approaching of an emergency vehicle and so forth.

The ETC communication is the communication (V2I) between a roadside device 52 which is installed at a gate of a toll road such as a highway and so forth and the vehicle 20. The ETC communication is utilized for charging when the vehicle 20 enters and exists from the toll road.

The DSRC communication is the communication (V2I) between a roadside device 53 which is installed on the highway, an ordinary road and so forth and the vehicle 20. The DSRC communication is used for reception of information on traffic congestion occurring on the highway, the ordinary road and so forth. The traffic congestion information that the vehicle 20 receives is utilized for, for example, searching for an optimum route of a navigation system of the vehicle 20.

V2N (Vehicle-to-Network) communication is communication by Internet access utilizing the mobile phone network and is the communication performed by using, for example, the above-described LTE/5G communication function 101. The V2N communication enables communication between a cloud 54 and so forth and the vehicle 20 and is utilized for updating of map data of the navigation system and services (maintenance) of an automobile manufacturer.

Figure 4:
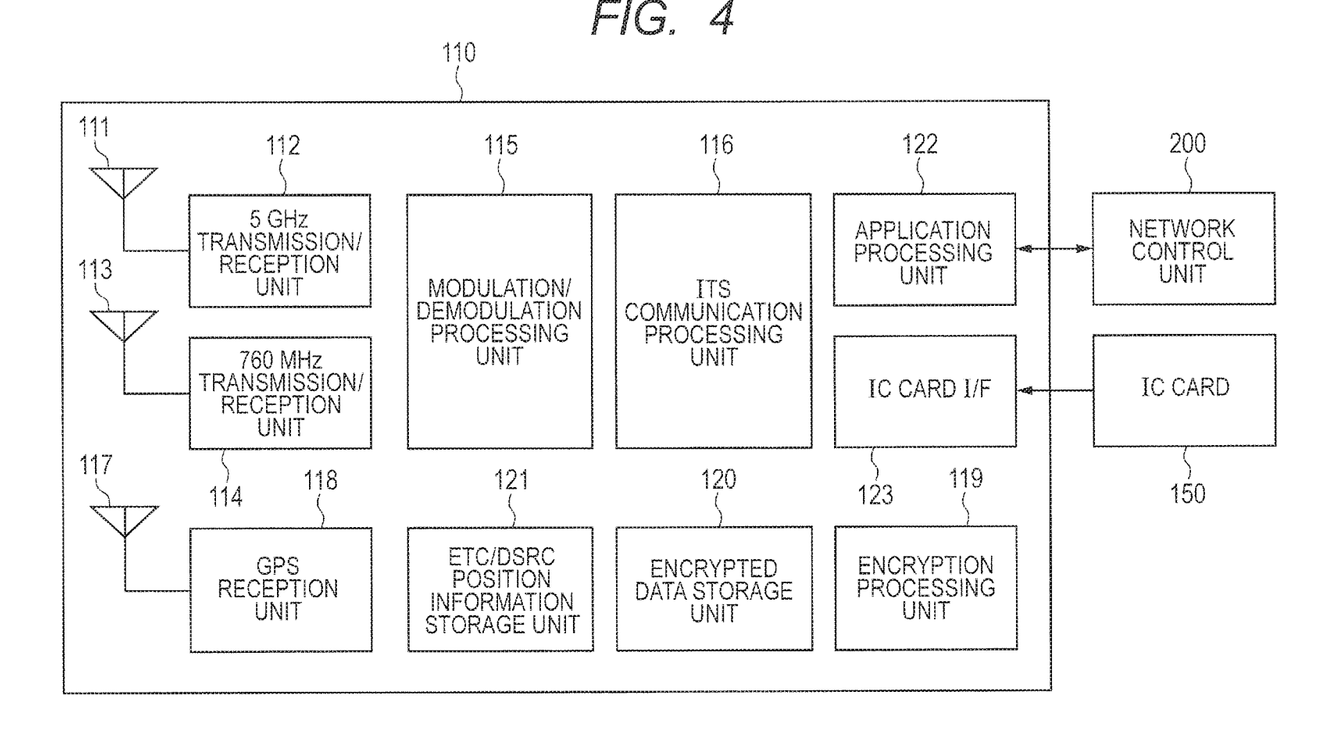
FIG. 4 is a block diagram illustrating one example of a configuration of an on-vehicle communication device according to the first embodiment.

Then, details of the ETC/DSRC/V2X communication function 103 will be described. Incidentally, in the description "ETC/DSRC/V2X communication function 103", "V2X" indicates the above-described specific V2X communication. In the following, the specific V2X communication will be simply referred to as V2X communication. FIG. 4 is a block diagram illustrating one example of a configuration of an on-vehicle communication device 110 which achieves the ETC/DSRC/V2X communication function 103. Incidentally, the on-vehicle communication device 110 corresponds to the on-vehicle communication device 2 in FIG. 1.

The on-vehicle communication device 110 is a communication device adapted to perform communication for ITS and has an antenna 111, a 5-GHz transmission/reception unit 112, an antenna 113, a 760-MHz transmission/reception unit 114, a modulation/demodulation processing unit 115, an ITS communication processing unit 116, a GPS antenna 117, a GPS reception unit 118, an encryption processing unit 119, an encrypted data storage unit 120, an ETC/DSRC position information storage unit 121, an application processing unit 122, an IC card I/F 123 and so forth.

The antenna 111 is an antenna through which electric waves used for performing the ETC communication or the DSRC communication are transmitted and received. The 5-GHz transmission/reception unit 112 is a transmission/reception circuit adapted to perform the ETC communication or the DSRC communication by using the antenna 111. In Japan, use of electric waves of 5.8 GHz is defined for the ETC communication and the DSRC communication. Therefore, in the first embodiment, the 5-GHz transmission/reception unit 112 has a circuit configuration which is made so as to transmit and receive signals in the 5-GHz band and transmission and reception of the 5.8-GHz signals are performed by the 5-GHz transmission/reception unit 112.

The antenna 113 is an antenna through which electric waves for performing the V2X communication are transmitted and received. The 760-MHz transmission/reception unit 114 is a transmission/reception circuit adapted to perform the V2X communication by using the antenna 113. In Japan, use of 760-MHz electric waves is defined for the V2X communication. Therefore, in the first embodiment, the 760-MHz transmission/reception unit 114 has a circuit configuration which is made so as to transmit and receive 760-MHz signals.

The on-vehicle communication device 110 performs road-to-vehicle communication by using the antenna 111 and the 5-GHz transmission/reception unit 112 and performs the road-to-vehicle communication or vehicle-to-vehicle communication by using the antenna 113 and the 760-MHz transmission/reception unit 114 in this way.

The modulation/demodulation processing unit 115 is a circuit which performs modulation processing on a transmission signal and demodulation processing on a reception signal. That is, the modulation/demodulation processing unit 115 performs the modulation processing on a signal that the 5-GHz transmission/reception unit 112 transmits and the modulation processing on a signal that the 760-MHz transmission/reception unit 114 transmits. In addition, the modulation/demodulation processing unit 115 performs the demodulation processing on a signal that the 5-GHz transmission/reception unit 112 receives and the demodulation processing on a signal that the 760-MHz transmission/reception unit 114 receives. For example, the modulation/demodulation processing unit 115 uses an ASK (Amplitude Shift Keying) system for communication with an ETC roadside device, uses a QPSK (Quadrature Phase Shift Keying) system for communication with a DSRC roadside device and uses an OFDM (Orthogonal Frequency-Division Multiplexing) system for the V2X communication as modulation systems.

The ITS communication processing unit 116 controls operating states (electric power states) of the respective constitutional units of the on-vehicle communication device 110. In particular, in a case where the vehicle 20 on which the on-vehicle communication device 110 is loaded approaches the ETC roadside device or the DSRC roadside device, the ITS communication processing unit 116 switches the electric power state of the 5-GHz transmission/reception unit 112 from the power-saving state to the non-power-saving state. The ITS communication processing unit 116 brings the 5-GHz transmission/reception unit 112 into the power-saving state, for example, by controlling so as not to supply predetermined electric power to circuit elements which configure the 5-GHz transmission/reception unit 112. In contrast, the ITS communication processing unit 116 brings the 5-GHz transmission/reception unit 112 into the non-power-saving state by controlling so as to supply the predetermined electric power to the circuit elements which configure the 5-GHz transmission/reception unit 112. The ITS communication processing unit 116 corresponds to the communication control unit 9 in FIG. 1 in this sense. Incidentally, a specific electric power state switching sequence will be described later by using flowcharts in FIG. 5A and FIG. 5B.

In addition, the ITS communication processing unit 116 performs processing according to a predetermined communication protocol. That is, the ITS communication processing unit 116 performs the processing in accordance with a predetermined communication protocol for communication with the ETC roadside device (1) in a case of performing communication with the ETC roadside device. The ITS communication processing unit 116 performs the processing in accordance with a predetermined communication protocol for communication with the DSRC roadside device (2) in a case of performing communication with the DSRC roadside device. The ITS communication processing unit 116 performs the processing in accordance with a predetermined communication protocol for the V2X communication (3) in a case of the V2X communication. The modulation/demodulation processing unit 115 performs modulation processing on a signal that the ITS communication processing unit 116 outputs. In addition, the ITS communication processing unit 116 performs processing on a signal which is demodulated by the modulation/demodulation processing unit 115.

The GPS antenna 117 is an antenna through which a GPS signal is received and the GPS reception unit 118 receives the GPS signal through the GPS antenna 117.

The encryption processing unit 119 performs predetermined encryption processing on data such as charging data, communication data and so forth. In addition, the encrypted data storage unit 120 is a storage unit which stores data securely and stores, for example, data encrypted by the encryption processing unit 119. The encrypted data storage unit 120 is configured by a non-volatile memory such as, for example, a flash memory and so forth.

The IC card I/F 123 is an interface adapted to read information out of an IC card 150. The IC card 150 is, for example, an ETC card in which information used for the ETC communication is stored. The IC card I/F 123 reads the information out of the IC card 150 and writes information into the IC card 150.

The ETC/DSRC position information storage unit 121 corresponds to the roadside device position information storage unit 6 in FIG. 1 and stores in advance information indicating the position of the roadside device which is a communication object for communication using the 5-GHz transmission/reception unit 112. Specifically, the ETC/DSRC position information storage unit 121 stores position information indicating positions of the respective ETC roadside devices which are installed in a predetermined geographical range and position information indicating positions of respective DSRC roadside devices which are installed in the predetermined geographical range. The position information of each roadside device is configured by, for example, information on latitude, longitude, height and so forth of an installation position of each roadside device. The ETC/DSRC position information storage unit 121 is configured by the non-volatile memory such as, for example, the flash memory and so forth.

The application processing unit 122 performs processing according to application software. The application processing unit 122 performs predetermined processing on information which is received via the 5-GHz transmission/reception unit 112, the 760-MHz transmission/reception unit 114 and/or the GPS reception unit 118 and/or information which is received via the IC card I/F 123.

In the first embodiment, in particular, the application processing unit 122 performs processing for controlling the electric power state of the 5-GHz transmission/reception unit 112. In the following, the processing for controlling the electric power state will be described. The application processing unit 122 calculates the position of the vehicle 20 on which the on-vehicle communication 110 is loaded in accordance with information obtained via the GPS antenna 117 and the GPS reception unit 118. That is, the application processing unit 122 corresponds to the vehicle position information acquisition unit 7 in FIG. 1 and acquires the position information of the vehicle 20. Incidentally, calculation of the position of the vehicle 20 is repetitively performed, for example, in a predetermined cycle so as to enable acquisition of the current position of the vehicle 20.

In addition, the application processing unit 122 decides whether the vehicle 20 approaches any one of the roadside devices on the basis of the position information of the roadside devices stored in the ETC/DSRC position information storage unit 121 and the position information of the vehicle 20. The application processing unit 122 compares the position information of the vehicle 20 with the position information (the installation positions) of the roadside devices that the ETC/DSRC position information storage unit 121 stores in advance whenever necessary and decides that the vehicle 20 reaches the roadside device concerned in a case where a distance between the vehicle 20 and the roadside device concerned is reduced to a set value (for example, 100 m) or less. That is, the application processing unit 122 also corresponds to the approach decision unit 8 in FIG. 1. In a case where the application processing unit 122 decides that the vehicle 20 approaches any one of the roadside devices, the application processing unit 122 notifies the ITS communication processing unit 116 of occurrence of approach. Thereby, the ITS communication processing unit 116 switches the electric power state of the 5-GHz transmission/reception unit 112 from the power-saving state to the non-power-saving state.

Incidentally, the application processing unit 122 is able to perform various kinds of processing not limited to the above-described processing. For example, the application processing unit 122 reads information out of the IC card 150, performs predetermined processing for charging and transmits/receives predetermined information to/from the ETC roadside device via the 5-GHz transmission/reception unit 122. For example, the application processing unit 122 performs authentication processing and data generation processing which are necessary for the road-to-vehicle communication for charging when the vehicle 20 travels on the toll road by utilizing the encryption processing unit 119 and the encrypted data storage unit 120 and communicates with the roadside device concerned via the 5-GHz transmission/reception unit 112 under communication control of the ITS communication processing unit 116. In addition, the application processing unit 122 may perform predetermined processing on information which is received from another/other constitutional element(s) in the vehicle 20 via the network control unit 200.

Each of the ITS communication processing unit 116 and the application processing unit 122 is equipped with, for example, a processor and a memory and performs the above-described processing by executing a program stored in the memory by using the processor. That is, each of the ITS communication processing unit 116 and the application processing unit 122 has a function that it works as a computer.

In addition, it is possible to store the above-described program by using various types of non-temporary computer-readable recording media and to supply the stored program to the computer. The non-temporary computer-readable recording media include various types of substantial recording media. As examples of the non-temporary computer-readable recording media, magnetic recording media (for example, a flexible disc, a magnetic tape, a hard disc drive and so forth), magneto-optical recording media (for example, a magneto-optical disc and so forth)), a CD-ROM (Read Only Memory), a CD-R (Compact Disc-Recordable), a CD-RW (Compact Disc-ReWritable), semiconductor memories (for example, a mask ROM, a PROM (Programmable ROM), an EPROM (Erasable PROM), a flash ROM, a RAM (Random Access Memory) and so forth are included. In addition, the program may be supplied to the computer by means of various types of temporary computer-readable media. As examples of the temporary computer-readable media, an electric signal, an optical signal, an electromagnetic wave and so forth are included. The temporary computer-readable media are able to supply the program to the computer via a wired communication path using an electric wire, an optical fiber and so forth and/or a wireless communication path.

Incidentally, each of the ITS communication processing unit 116 and the application processing unit 122 may execute the above-described processing by a hardware circuit and/or may execute the above-described processing by a configuration that software is combined with hardware.

Figure 5A:
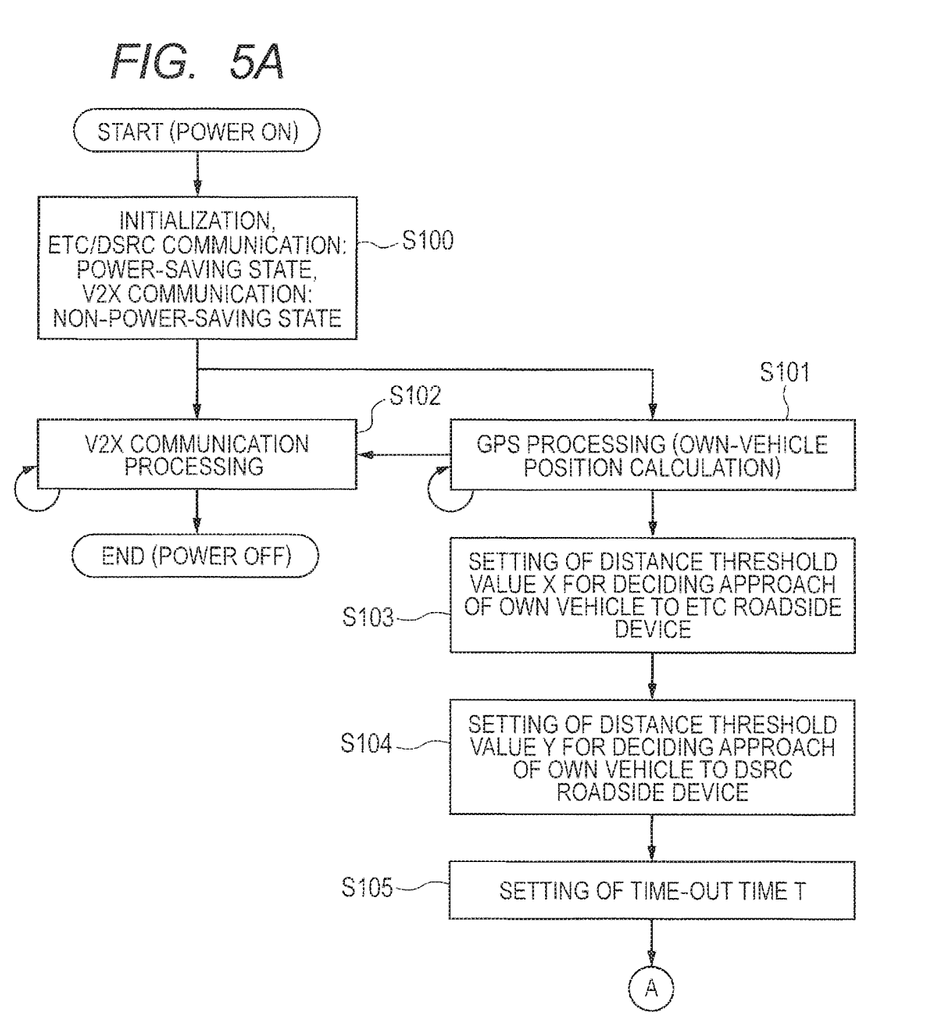
FIG. 5A is a flowchart illustrating one example of a former part of an operation of the on-vehicle communication device according to the first embodiment.
Figure 5B:
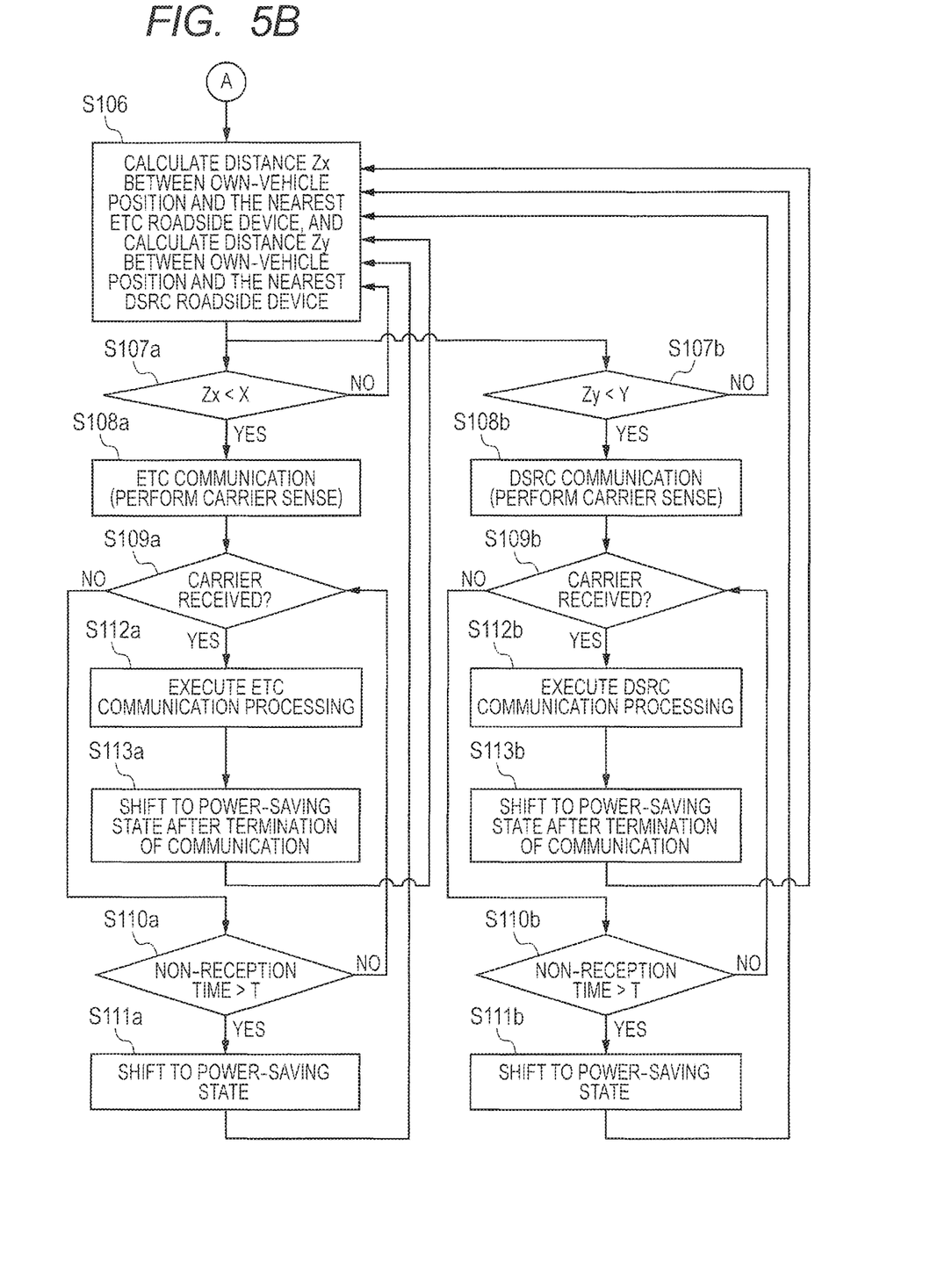
FIG. 5B is a flowchart illustrating one example of a latter part of the operation of the on-vehicle communication device according to the first embodiment.

Then, communication control in the on-vehicle communication device 110 will be specifically described by using flowcharts. FIG. 5A and FIG. 5B are flowcharts illustrating one example of an operation of the on-vehicle communication device 110. In the following, description will be made along the flowcharts in FIG. 5A and FIG. 5B.

When a power source of the on-vehicle communication device 110 is turned on, in step 100 (S100), the ITS communication processing unit 116 performs initial setting processing. The ITS communication processing unit 116 performs setting (for example, setting of a frequency, setting of a register for communication control and so forth) necessary for, for example, the ETC communication, the DSRC communication and the V2X communication as initial setting. Then, the ITS communication processing unit 116 sets a power-saving mode for the ETC communication and the DSRC communication and sets a non-power-saving mode for the V2X communication. That is, the ITS communication processing unit 116 switches the electric power state of the 5-GHz transmission/reception unit 112 to the power-saving state to bring the 5-GHz transmission/reception unit 112 into a state of not performing transmission and reception processing. In addition, the ITS communication processing unit 116 switches the electric power state of the 760-MHz transmission/reception unit 114 to the non-power-saving state to bring the 760-MHz transmission/reception unit 114 into a transmittable and receivable state. In association with this setting, the road-to-vehicle or vehicle-to-vehicle V2X communication processing is started.

At the completion of the initial setting, in step 101 (S101), the application processing unit 122 performs the GPS processing. That is, the application processing unit 122 cyclically and repetitively calculates the position of the own vehicle (the vehicle 20 on which the on-vehicle communication device 110 is loaded) in accordance with information obtained via the GPS antenna 117 and the GPS reception unit 118. Then, in step 102 (S102), the ITS communication processing unit 116 notifies another/other vehicle(s) and/or roadside device(s) of the calculated position of the vehicle 20 via the V2X communication.

In addition, at the completion of the initial setting, in step 103 (S103), the application processing unit 122 sets a distance threshold X used for deciding whether the own vehicle 20 approaches the ETC roadside device.

Then, in step 104 (S104), the application processing unit 122 sets a distance threshold Y used for deciding whether the own vehicle 20 approaches the DSRC roadside device.

Then, in step 105 (S105), the application processing unit 122 sets a time-out time T. The time-out time T is a time threshold used for controlling to bring the 5-GHz transmission/reception unit 112 back to the power-saving state in a case where a state where it is impossible to start communication with the roadside device lasts for a definite period of time or more.

Incidentally, for example, values which are determined in advance are set as the distance thresholds X and Y and the time-out time T respectively. In addition, the application processing unit 122 is also referred to as a threshold setting unit.

The on-vehicle communication device 110 repetitively performs the V2X communication in step 102, calculation of the position of the vehicle 20 in step 101 and processes in step 106 and subsequent steps until the power source is turned off.

In step 106 (S106), the application processing unit 122 calculates a distance Zx between the own vehicle 20 and the ETC roadside device which is the closest to the position of the own vehicle 20 and a distance Zy between the own vehicle 20 and the DSRC roadside device which is the closest to the position of the own vehicle 20. Specifically, the application processing unit 122 calculates the distances Zx and Zy by comparing the position of each roadside device stored in the ETC/DSRC position information storage unit 121 with the position of the vehicle 20 calculated in step 101.

After execution of a process in step 106, processes (step 107a to step 113a) for the ETC communication and processes (step 107b to step 113b) for the DSRC communication are executed concurrently with each other.

In step 107a (S107a), the application processing unit 122 compares the distance threshold X set in step 103 with the distance Zx calculated in step 106 and decides whether Zx is less than X. In a case where Zx is less than X, the process proceeds to step 108a. In a case where Zx is more than X, execution of the processes in step 106 and subsequent steps is again repeated.

In step 108a (S108a), the ITS communication processing unit 116 switches the electric power state of the 5-GHz transmission/reception unit 112 from the power-saving state to the non-power-saving state. That is, the ITS communication processing unit 116 controls to supply predetermined electric power to circuit elements which configure the 5-GHz transmission/reception unit 112 and brings the state of the 5-GHz transmission/reception unit 112 into the non-power-saving state which enables signal transmission and reception. Thereby, monitoring of presence/absence of the electric wave from the roadside device concerned is started.

In a case where the electric wave (a carrier) from the roadside device concerned is received by the 5-GHz transmission/reception unit 112 (Yes in step 109a (S109a)), the process proceeds to step 112a. On the other hand, in a case where the electric wave from the roadside device concerned is not received, execution of the decision on the time-out time T in step 110a and the decision on carrier reception in step 109a is repeated.

In step 110a (S110a), the ITS communication processing unit 116 decides whether a duration (that is, an electric wave non-reception time) of a state where the electric wave is not received from the roadside device concerned exceeds the time-out time T which is set in step 105. Incidentally, the duration is a time which is counted from a point of time at which the electric power state of the 5-GHz transmission/reception unit 112 is switched to the non-power-saving state. Execution of the decision in step 109a is repeated as long as the non-reception time does not exceed the time-out time T. However, in a case where the non-reception time exceeds the time-out time T, the process proceeds to step 111a.

In step 111a (S111a), the ITS communication processing unit 116 switches the electric power state of the 5-GHz transmission/reception unit 112 from the non-power-saving state to the power-saving state. That is, in a case where the duration of the state where it is impossible to start communication with the roadside device concerned reaches the time threshold T after switching the electric power state of the 5-GHz transmission/reception unit 112 from the power-saving state to the non-power-saving state, the ITS communication processing unit 116 brings the 5-GHz transmission/reception unit 112 from the non-power-saving state back to the power-saving state. Therefore, it is possible to suppress continuous consumption of the electric power in a situation where it is impossible to start the communication with the roadside device concerned.

In step 112a (S112a), the ITS communication processing unit 116 communicates with the ETC roadside device which is an electric wave transmission source by using the 5-GHz transmission/reception unit 112.

Then, after termination of the communication with the ETC roadside device, the ITS communication processing unit 116 switches the electric power state of the 5-GHz transmission/reception unit 112 from the non-power-saving state to the power-saving state in step 113a (S113a). When the electric power state of the 5-GHz transmission/reception unit 112 is switched in this way, the process returns to step 106. Thereby, processes for next communication with the roadside device concerned are executed.

Processes for the DSRC communication in step 107b to step 113b are the same as the processes for the ETC communication in step 107a to step 113a. In the following, step 107b to step 113b will be briefly described.

In step 107b (S107b), the application processing unit 122 compares the distance threshold Y with the distance Zy and decides whether Zy is less than Y. In a case where Zy is less than Y, the process proceeds to step 108b. In a case where Zy is more than Y, execution of the processes in step 106 and subsequent steps is repeated again.

In step 108b (S108b), the ITS communication processing unit 116 switches the electric power state of the 5-GHz transmission/reception unit 112 from the power-saving state to the non-power-saving state.

In a case where the electric wave from the roadside device concerned is received (Yes in step 109b (S109b)), the process proceeds to step 112b. On the other hand, in a case where the electric wave from the roadside device concerned is not received, execution of the decision on the time-out time T in step 110b and the decision on the carrier reception in step 109b is repeated.

In step 110b (S110b), the ITS communication processing unit 116 decides whether the duration of the state where the electric wave from the roadside device concerned is not received exceeds the time-out time T. Execution of the decision in step 109b is repeated as long as the non-reception time does not exceed the time-out time T. However, in a case where the non-reception time exceeds the time-out time T, the process proceeds to step 111b.

In step 111b (S111b), the ITS communication processing unit 116 switches the electric power state of the 5-GHz transmission/reception unit 112 from the non-power-saving state to the power-saving state.

In step 112b (S112b), the ITS communication processing unit 116 communicates with the DSRC roadside device which is an electric wave transmission source by using the 5-GHz transmission/reception unit 112. Then, at termination of communication with the DSRC roadside device, the ITS communication processing unit 116 switches the electric power state of the 5-GHz transmission/reception unit 112 from the non-power-saving state to the power-saving state in step 113*b* (S113*b*). When the electric power state of the 5-GHz transmission/reception unit 112 is switched in this way, the process returns to step 106. Thereby, the processes for the next communication with the roadside device concerned are executed.

In a case where a 5.8-GHz radio wave is used in the ETC communication and the DSRC communication, a reach distance of the radio wave is short and generally ranges from several meters to dozens of meters though depending on the surrounding environment (presence of obstacles). On the other hand, the speed of the vehicle on the highway is fast and ranges from about 80 km an hour to about 100 km an hour and the vehicle 20 travels a distance of about 22 m to about 28 m per second. In addition, also a time (for example, about one second) taken for switching the electric power state of the 5-GHz transmission/reception unit 112 from the power-saving state to the non-power-saving state exists. Accordingly, the application processing unit 122 sets values, for example, ranging from 100 m to 150 m as the values of the distance thresholds X and Y.

Incidentally, the distance thresholds X and Y may be set in accordance with the speed of the vehicle 20. That is, the application processing unit 122 may acquire speed information of the vehicle 20, may set the distance thresholds X and Y in accordance with the speed information and, in a case where a difference between the position of the vehicle 20 and the position of the roadside device concerned is not more than the distance thresholds X and Y, may decide that the vehicle 20 approaches the roadside device concerned. Specifically, the faster the speed of the vehicle 20 is, the larger the values of the thresholds X and Y may be set. By configuring the application processing unit 122 in this way, it is possible to set the appropriate distance thresholds X and Y in accordance with the speed of the vehicle 20 and it becomes possible to more surely achieve communication with the roadside device concerned. Incidentally, although the application processing unit 122 acquires an output from a vehicle speed sensor which is installed on the vehicle 20 via the network control unit 200, the speed information of the vehicle 20 may be acquired by another/other optional method(s).

In a case where the distance thresholds X and Y are set in accordance with the speed of the vehicle 20, the values of the thresholds X and Y are set, for example, immediately before execution of the process in step 107*a* or step 107*b*.

In addition, although a value ranging from, for example, about 5 to about 10 seconds is set as the time-out time T (the time threshold), also the time-out time T may be set in accordance with the speed of the vehicle 20. That is, the application processing unit 122 may acquire the speed information of the vehicle 20 and may set the time-out time T in accordance with the speed information of the vehicle 20. Specifically, the slower the speed of the vehicle 20 is, the larger the value of the time-out time T may be set. By configuring the application processing unit 122 in this way, it is possible to set the appropriate time-out time T in accordance with the speed of the vehicle 20 and it becomes possible to more surely achieve communication with the roadside device concerned.

In a case where the time threshold T is set in accordance with the speed of the vehicle 20, the value of the time threshold T is set, for example, immediately before execution of the process in step 110*a* or step 110*b*.

According to the above-described on-vehicle communication device 110, only in a case where the roadside device is present in the periphery of the vehicle 20 on which the on-vehicle communication device 110 is loaded, the electric power state of the 5-GHz transmission/reception unit 112 is switched from the power-saving state to the non-power-saving state. Accordingly, an operation of typically monitoring the electric wave of the roadside device becomes unnecessary and a noticeable reduction in power consumption is achieved. According to the on-vehicle communication device 110, for example, in a case where the ETC communication and the DSRC communication are performed twenty times during travelling for 12 hours per day, it is possible to reduce the power consumption about $1/10$ in comparison with a case of not using the configuration of the first embodiment.

Incidentally, in the on-vehicle communication device 110 according to the first embodiment, the electric power state of the 5-GHz transmission/reception unit 112 is switched from the power-saving state to the non-power-saving state by focusing on only a positional relation between the vehicle 20 and the roadside device concerned. Alternatively, the electric power state may be switched also by taking a traveling route of the vehicle 20 into consideration. For example, in such a situation where roads are in a grade separation, even in a case where there exists a roadside device which meets conditions of the distance thresholds X and Y in positional relation with the vehicle 20, there is the possibility that the roadside device concerned may not be present on the traveling route of the vehicle 20. In this case, the vehicle 20 does not enter an area where communication with the roadside device concerned is possible and the electric power state of the 5-GHz transmission/reception unit 112 is switched to the non-power-saving state wastefully.

Accordingly, the application processing unit 122 may acquire a scheduled travelling route of the vehicle 20 and may decide whether the vehicle 20 approaches the roadside device which is present in the vicinity of the scheduled traveling route in order to more suppress the wasteful power consumption. For example, the application processing unit 122 acquires the scheduled traveling route of the vehicle 20 from a navigation system of the HMI processing unit 300 via the network control unit 200 and executes the process in step 106 on the roadside devices which are present on the acquired scheduled traveling route. Owing to provision of such a configuration, more suppression of the power consumption becomes possible.

Second Embodiment

The second embodiment is different from the first embodiment in the point that updating of the position information of the roadside devices that the ETC/DSRC position information storage unit 121 stores is possible. In the following, points which are different from those in the first embodiment will be described and description of the configurations and the operations which are the same as those in the first embodiment is omitted.

The application processing unit 122 according to the second embodiment updates the position information of the roadside devices in addition to the processes that the application processing unit 122 performs in the first embodiment. Specifically, the application processing unit 122 acquires updated information for the position information of the roadside devices and updates the position information stored in the ETC/DSRC position information storage unit 121 on the basis of the updated information. Incidentally, the application processing unit 122 is also referred to as an update unit.

As described above, the out-vehicle communication unit 100 is the on-vehicle communication device having the LTE/5G communication function 101 and the Wi-Fi/Bluetooth communication function 102. Accordingly, acquisition of the updated information using one of the communication functions 101 and 102 becomes possible, for example, by arranging an interface used for coupling with a communication device which achieves one of the communication functions 101 and 102 in the on-vehicle communication device 110 illustrated in FIG. 4 or coupling with this communication device via the network control unit 200. That is, the application processing unit 122 may acquire latest position information of the roadside devices as the updated information from the cloud 54 (a server) via, for example, the communication over the mobile phone network or the Wi-Fi communication.

The application processing unit 122 compares, for example, the information that the ETC/DSRC position information storage unit 121 stores with the latest information stored in the server and in a case where the information that the ETC/DSRC position information storage unit 121 stores is old, updates the contents stored in the ETC/DSRC position information storage unit 121 by using the downloaded updated information.

According to the second embodiment, the contents stored in the ETC/DSRC position information storage unit 121 are updated. Therefore, even in a case where environmental changes such as installation of a new roadside device, removal of an old roadside device, replacement of one roadside device with another roadside device and so forth occur, it is possible to achieve appropriate control.

Third Embodiment

The V2X communication in Europe and North America is standardized on the basis of the IEEE802.11p and the frequency utilized in the V2X communication is 5.9 GHz. Therefore, the frequency used in the V2X communication in Europe and North America is almost the same as the frequency (5.8 GHz) utilized in the DSRC communication and the ETC communication in Japan. The on-vehicle communication device 110 according to the first embodiment is applicable to the ITS wireless communication system in Japan. On the other hand, the on-vehicle communication device 110 according to the third embodiment is applicable not only to the ITS wireless communication system in Japan but also to the V2X communication in Europe and North America.

Figure 6:
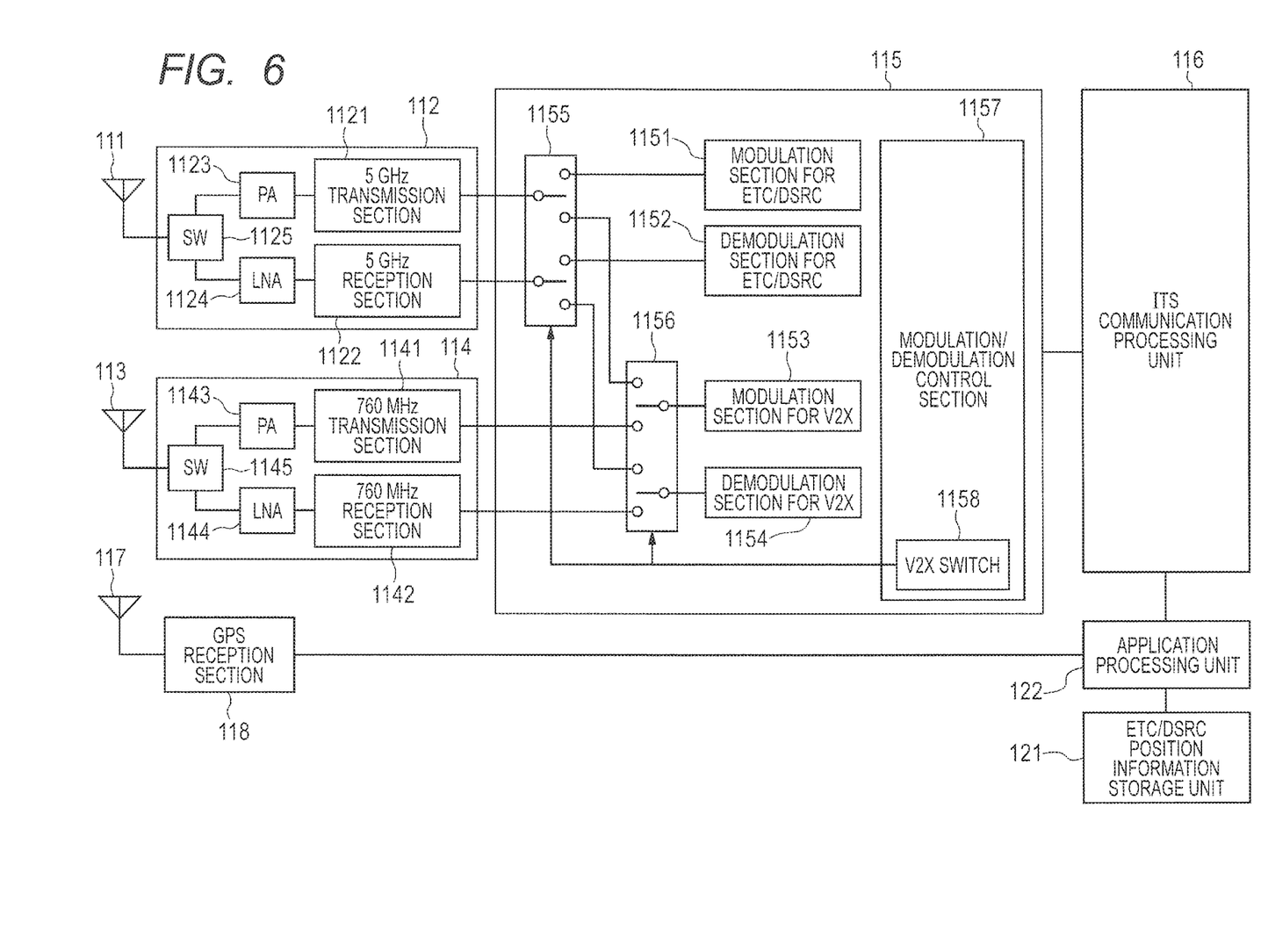
FIG. 6 is a schematic diagram illustrating one example of a configuration of an on-vehicle communication device according to a third embodiment.

FIG. 6 is a schematic diagram illustrating one example of a configuration of the on-vehicle communication device 110 according to the third embodiment. Incidentally, FIG. 6 is a diagram illustrating the configuration of the on-vehicle communication device 110 illustrated in FIG. 4 in more detail. However, in FIG. 6, for simplification of the drawing, illustration of the IC card I/F 123, the encryption processing unit 119 and the encrypted data storage unit 120 in FIG. 4 is omitted. In the following, the configuration of the on-vehicle communication device 110 according to the third embodiment will be described with reference to FIG. 6. Incidentally, description of the configurations and the operations which are the same as those in the first embodiment is appropriately omitted. Incidentally, it is possible to combine the configuration of the third embodiment not only with the configuration described in the first embodiment but also with the configuration described in the second embodiment.

As illustrated in FIG. 6, the 5-GHz transmission/reception unit 112 is a transmission/reception circuit which has a 5-GHz transmission section 1121, a 5-GHz reception section 1122, a power amplifier 1123, a low-noise amplifier 1124 and a switch 1125.

The 5-GHz transmission/reception unit 112 is a circuit which transmits and receives radio signals in a frequency band (a first frequency band) which is determined in advance. Specifically, the first frequency band is a frequency band which includes 5.8 GHz and 5.9 GHz. The 5-GHz transmission section 1121 is a circuit which performs predetermined transmission processing for transmitting the radio signals in the first frequency band. The 5-GHz transmission section 1121 is coupled with a signal switch circuit 1155 of the modulation/demodulation processing unit 115. The 5-GHz transmission section 1121 performs predetermined processing on a signal which is output from one of an ETC/DSRC-use modulation section 1151 and a V2X-use modulation section 1153 which is selected by the signal switch circuit 1155 and outputs the processed signal to the power amplifier 1123. Incidentally, the 5-GHz transmission section 1121 is able to be coupled with the V2X-use modulation section 1153 via the signal switch circuit 1155 and a signal switch circuit 1156.

In a case where the 5-Ghz transmission section 1121 processes a signal output from the ETC/DSRC-use modulation section 1151, the signal switch circuit 1155 electrically couples the 5-GHz transmission section 1121 with the ETC/DSRC-use modulation section 1151. In a case where the 5-GHz transmission section 1121 processes a signal output from the V2X-use modulation section 1153, the signal switch circuit 1155 and the signal switch circuit 1156 electrically couple the 5-GHz transmission section 1121 with the V2X-use modulation section 1153.

The switch 1125 is a switch used to make the switch as to whether the antenna 111 is used for signal transmission or signal reception. The electric wave received through the antenna 111 is input into the low-noise amplifier 1124.

The 5-GHz reception section 1122 is a circuit which performs predetermined reception processing for receiving the signal in the first frequency band. The 5-GHz reception section 1122 is coupled with the signal switch circuit 1155 of the modulation/demodulation processing unit 115. The 5-GHz reception section 1122 performs predetermined processing on a signal that the low-noise amplifier 1124 outputs and outputs the processed signal to one of an ETC/DSRC-use demodulation section 1152 and an V2X-use demodulation section 1154 which is selected by the signal switch circuit 1155. Incidentally, the 5-GHz reception unit 1122 is able to be coupled with the V2X-use demodulation section 1154 via the signal switch circuit 1155 and the signal switch circuit 1156.

In a case where the 5-GHz reception section 1122 performs processing for receiving a signal for the ETC/DSRC communication, the signal switch circuit 1155 electrically couples the 5-GHz reception section 1122 with the ETC/DSRC-use demodulation section 1152. In a case where the 5-GHz reception section 1122 performs processing for receiving a signal for the V2X communication, the signal switch circuit 1155 and the signal switch circuit 1156 electrically couple the 5-GHz reception section 1122 with the V2X-use demodulation section 1154.

As illustrated in FIG. 6, the 760-MHz transmission/reception unit 114 is a transmission/reception circuit having a 760-MHz transmission section 1141, a 760-MHz reception section 1142, a power amplifier 1143, a low-noise amplifier 1144 and a switch 1145.

The 760-MHz transmission/reception unit 114 is the circuit which transmits and receives radio signals in a frequency band which is determined in advance (a second frequency band). Specifically, the second frequency band is a frequency band which includes 760 MHz. The 760-MHz transmission section 1141 is a circuit which performs predetermined transmission processing for transmitting the radio signals in the second frequency band. The 760-MHz transmission section 1141 is coupled with the signal switch circuit 1156 of the modulation/demodulation processing unit 115. In a case where the 760-MHz transmission section 1141 is electrically coupled with the V2X-use modulation section 1153 by the signal switch circuit 1156, the 760-MHz transmission section 1141 performs predetermined processing on a signal that the V2X-use modulation section 1153 outputs and outputs the processed signal to the power amplifier 1143.

Incidentally, the 5-GHz transmission/reception unit 112 and the 760-MHz transmission/reception unit 114 are configured as semiconductor devices. Therefore, the 5-GHz transmission/reception unit 112 is able to transmit and receive the signals in the first frequency band including 5.8 GHz and 5.9 GHz without changing a hardware configuration.

The switch 1145 is a switch used to make the switch as to whether the antenna 113 is used for signal transmission or signal reception. The electric wave received through the antenna 113 is input into the low-noise amplifier 1144.

The 760-MHz reception unit 1142 is a circuit which performs predetermined reception processing for receiving the signals in the second frequency band. The 760-MHz reception section 1142 is coupled with the signal switch circuit 1156 of the modulation/demodulation processing unit 115. In a case where the 760-MHz reception section 1142 is electrically coupled with the V2X-use demodulation section 1154 by the signal switch circuit 1156, the 760-MHz reception section 1142 performs predetermined processing on a signal that the low-noise amplifier 1124 outputs and outputs the processed signal to the V2X-use demodulation section 1154.

The modulation/demodulation processing unit 115 has the ETC/DSRC-use modulation section 1151, the ETS/DSRC-use demodulation section 1152, the V2X-use modulation section 1153, the V2X-use demodulation section 1154, the signal switch circuits 1155 and 1156 and a modulation/demodulation control section 1157.

The ETC/DSRC-use modulation section 1151 is a circuit which performs predetermined modulation processing for the ETC communication or the DSRC communication and the ETC/DSRC-use demodulation section 1152 is a circuit which performs predetermined demodulation processing for the ETC communication or the DSRC communication. The ETC/DSRC-use modulation section 1151 and the ETC/DSRC-use demodulation section 1152 configure a first modulation/demodulation circuit which performs modulation and demodulation in accordance with a predetermined modulation system (a first modulation system).

The V2X-use modulation section 1153 is a circuit which performs predetermined modulation processing for the V2X communication and the V2X-use demodulation section 1154 is a circuit which performs predetermined demodulation processing for the V2X communication. The V2X-use modulation section 1153 and the V2X-use demodulation section 1154 configure a second modulation/demodulation circuit which performs modulation and demodulation in accordance with a predetermined modulation system (a second modulation system).

The ETC/DSRC-use modulation section 1151 and the V2X-use modulation section 1153 perform modulation processing under the control of the modulation/demodulation control section 1157 respectively. Likewise, the ETC/DSRC-use demodulation section 1152 and the V2X-use demodulation section 1154 perform demodulation processing under the control of the modulation/demodulation control section 1157 respectively.

The signal switch circuit 1155 is a circuit which switches a coupling destination of the 5-GHz transmission section 1121 to either the ETC/DSRC-use modulation section 1151 or the V2X-use modulation section 1153 and switches a coupling destination of the 5-GHz reception section 1122 to either the ETC/DSRC-use demodulation section 1152 or the V2X-use demodulation section 1154. The signal switch circuit 1156 is a circuit which switches a coupling destination of the V2X-use modulation section 1153 to either the 5-GHz transmission section 1121 or the 760-MHz transmission section 1141 and switches a coupling destination of the V2X-use demodulation section 1154 to either the 5-GHz reception section 1122 or the 760-MHz reception section 1142. Each of the signal switch circuits 1155 and 1156 switches the coupling destination in accordance with a switch control signal from the modulation/demodulation control section 1157.

The modulation/demodulation control section 1157 is a circuit which controls the modulation processing of the ETC/DSRC-use modulation section 1151 and the V2X-use modulation section 1153 and controls the demodulation processing of the ETC/DSRC-use demodulation section 1151 and the V2X-ude demodulation section 1154. In addition, the modulation/demodulation control section 1157 has a V2X switch control signal output part 1158. The V2X switch control signal output part 1158 outputs the switch control signal in accordance with instructions from the ITS communication processing unit 116 thereby to control the signal switch circuits 1155 and 1156 so as to switch the coupling destinations respectively. Specifically, for example, the V2X switch control signal output part 1158 outputs the switch control signal in accordance with a value which is set in a register arranged in the modulation/demodulation control section 1157 by the ITS communication processing unit 116 and controls the signal switch circuits 1155 and 1156 so as to switch the coupling destinations respectively.

The ITS communication processing unit 116 outputs instructions for designating either a first coupling state or a second coupling state to the modulation/demodulation processing unit 115. Incidentally, the ITS communication processing unit 116 executes a program and thereby outputs the instructions for designation of the coupling state to the modulation/demodulation processing unit 115. Here, the first coupling state is a state where the 5-GHz transmission/reception unit 112 and the above-described first modulation/demodulation circuit (that is, the ETC/DSRC-use modulation section 1151 and the ETC/DSRC-use demodulation section 1152) are coupled with each other and the 760-MHz transmission/reception unit 114 and the above-described second modulation/demodulation circuit (that is, the V2X-use modulation section 1153 and the V2X-use demodulation section 1154) are coupled with each other. In addition, the second coupling state is a state where the 5-GHz transmission/reception unit 112 and the above-described second modulation/demodulation circuit are coupled with each other. Incidentally, in the second coupling state, the first modulation/demodulation circuit is coupled with neither the 5-GHz transmission/reception unit 112 nor the 760-MHz transmission/reception unit 114. In addition, in the second coupling state, the 760-MHz transmission/reception unit 114 is coupled with neither the first modulation/demodulation circuit nor the second modulation/demodulation circuit.

The on-vehicle communication device 110 according to the third embodiment has the switch circuit (the signal switch circuits 1155 and 1156) which switches the coupling state so as to be brought into either the first coupling state or the second coupling state and is able to perform signal transmission/reception in accordance with either the first modulation system or the second modulation system by using the predetermined frequency bands in this way. More specifically, it is possible to perform the 5.9-GHz V2X communication which is adopted in Europe and North America by using the 5-GHz transmission/reception unit 112 utilized in the ETC communication and the DSRC communication in Japan. That is, the ITS communication processing unit 116 achieves the above-described second coupling state by executing the program and thereby it is possible to perform the 5.9-GHz V2X communication. In the third embodiment, it is possible to expand usage applications of the on-vehicle communication device 110 in this way.

The invention made by the inventors concerned is specifically described on the basis of the preferred embodiments as above. However, it goes without saying that the invention is not limited to the above-described embodiments and may be modified and altered in a variety of ways within the range not deviating from the gist of the present invention. For example, although in the above-described embodiments, the configuration that the electric power state of the 5-GHz transmission/reception unit 112 is controlled on the basis of the position information of the roadside devices used in the ETC communication or the DSRC communication is indicated, the electric power state of the 760-MHz transmission/reception unit 114 may be controlled also on the basis of the position information of the roadside devices used in the V2X communication in the same way.

What is claimed is:

1. A communication device which is loaded on a vehicle, the communication device comprising:
   a transmission and reception circuit that communicates with a roadside device, the transmission and reception circuit configured to switch between a power-saving state and a non-power-saving state;
   a first memory storing a position of the roadside device in advance;
   a processor; and
   a second memory storing a program, when executed by the processor, causes the processor to perform operations comprising:
      acquiring a position of the vehicle;
      determining a threshold distance based on 1) a distance that a radio wave emitted from the roadside device travels and 2) a duration for switching a state of the transmission and reception circuit from the power-saving state to the non-power-saving state;
      determining whether the vehicle approaches the roadside device based on determining that a distance between the position of the roadside device and the position of the vehicle is within the threshold distance; and
      switching, in response to determining that the vehicle approaches the roadside device, the state of the transmission and reception circuit from the power-saving state to the non-power-saving state to communicate with the roadside device.

2. The communication device according to claim 1, wherein the state of the transmission and reception circuit switches from the non-power-saving state to the power-saving state when a period of time in which the communication with the roadside device does not start after switching the state of the transmission and reception circuit from the power-saving state to the non-power-saving state reaches a time threshold.

3. The communication device according to claim 2, wherein the operations further comprises:
   setting the time threshold in accordance with speed information of the vehicle.

4. The communication device according to claim 1, wherein the operations further comprises acquiring a scheduled traveling route of the vehicle, and
   wherein the roadside device is present in a vicinity of the scheduled traveling route of the vehicle.

5. The communication device according to claim 1, wherein the operations further comprises:
   acquiring updated information of the position of the roadside device; and
   updating the position of the roadside device stored in the roadside device position information storage unit.

6. The communication device according to claim 1, wherein the transmission and reception circuit comprises:
   a first transmission/reception circuit that transmits and receives a radio signal in a first frequency band which is determined in advance; and
   a second transmission/reception circuit that transmits and receives the radio signal in a second frequency band which is determined in advance,
   wherein the communication device further comprises:
      a first modulation/demodulation circuit which performs modulation and demodulation in accordance with a first modulation system;
      a second modulation/demodulation circuit which performs modulation and demodulation in accordance with a second modulation system; and
      a switch circuit that switches a coupling state of the first transmission/reception circuit, the second transmission/reception circuit, the first modulation/demodulation circuit, and the second modulation/demodulation circuit between a first coupling state and a second coupling state,
   wherein the first coupling state is a state where 1) the first transmission/reception circuit and the first modulation/demodulation circuit are coupled with each other and 2) the second transmission/reception circuit and the second modulation/demodulation circuit are coupled with each other, and
   wherein the second coupling state is a state where the first transmission/reception circuit and the second modulation/demodulation circuit are coupled with each other.

7. The communication device according to claim 6, wherein the first frequency band includes 5.8 GHz and 5.9 GHz, and
   wherein the second frequency band includes 760 MHz.

8. The communication device according to claim 1, wherein the threshold distance is determined further based on speed information of the vehicle.

9. A communication control method comprising:
   storing a position of a roadside device into a roadside device position information storage in advance, the roadside device position information storage being installed in a vehicle;
   acquiring a position of the vehicle;
   determining a threshold distance based on 1) a distance that a radio wave emitted from the roadside device travels and 2) a duration for switching a state of the transmission and reception circuit from the power-saving state to the non-power-saving state;

determining whether the vehicle approaches the roadside device based on determining that a distance between the position of the roadside device and the position of the vehicle is within the threshold distance; and switching, in response to determining that the vehicle approaches the roadside device, a state of the transmission and reception circuit from the power-saving state to the non-power-saving state to communicate with the roadside device.

10. The communication control method according to claim 9, wherein the state of the transmission and reception circuit switches from the non-power-saving state to the power-saving state when a period of time in which the communication with the roadside device does not start after switching the state of the transmission and reception circuit from the power-saving state to the non-power-saving state reaches a time threshold.

11. The communication control method according to claim 10, further comprising:

setting the time threshold in accordance with speed information of the vehicle.

12. The communication control method according to claim 9, wherein the threshold distance is determined further based on speed information of the vehicle.

13. A vehicle comprising:

a communication device mounted on the vehicle, wherein the communication device comprises:

a transmission and reception circuit that communicates with a roadside device, the transmission and reception circuit configured to switch between a power-saving state and a non-power-saving state;

a first memory storing a position of the roadside device in advance;

a processor; and a second memory storing a program, when executed by the processor, causes the processor to perform operations of:

acquiring a position of the vehicle;

determining a threshold distance based on 1) a distance that a radio wave emitted from the roadside device travels and 2) a duration for switching a state of the transmission and reception circuit from the power-saving state to the non-power-saving state;

determining whether the vehicle approaches the roadside device based on determining that a distance between the position of the roadside device and the position of the vehicle is within the threshold distance; and switching, in response to determining that the vehicle approaches the roadside device, the state of the transmission and reception circuit from the power-saving state to the non-power-saving state to communicate with the roadside device.

14. The vehicle according to claim 13, wherein the state of the transmission and reception circuit switches from the non-power-saving state to the power-saving state when a period of time in which the communication with the roadside device does not start after switching the state of the transmission and reception circuit from the power-saving state to the non-power-saving state reaches a time threshold.

15. The vehicle according to claim 14, wherein the operations further comprises:

setting the time threshold in accordance with speed information of the vehicle.

16. The vehicle according to claim 13, wherein the threshold distance is determined further based on speed information of the vehicle.

* * * * *